April 19, 1927.
J. M. WATTAWA
BAIT BOX
Filed June 11, 1926
1,625,006
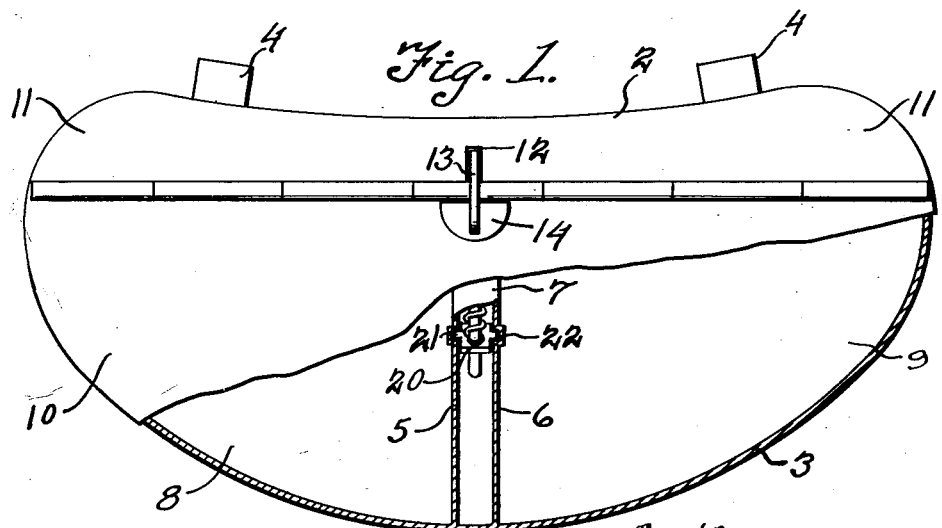
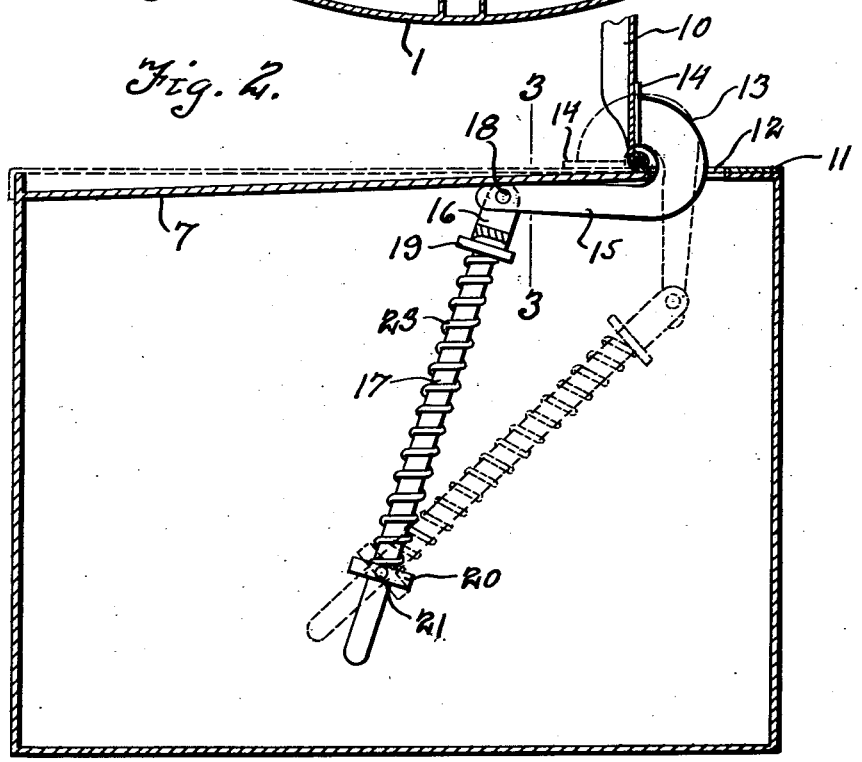
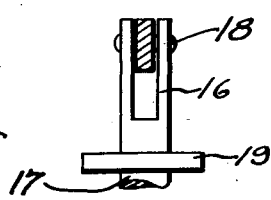
John M. Wattawa
INVENTOR
BY Victor J. Evans
ATTORNEY
WITNESS:

Patented Apr. 19, 1927.

1,625,006

UNITED STATES PATENT OFFICE.

JOHN M. WATTAWA, OF MANITOWOC, WISCONSIN.

BAIT BOX.

Application filed June 11, 1926. Serial No. 115,330.

This invention relates to bait boxes and its primary object is to provide a bait box designed to carry fishing bait of different varieties in separate compartments which are closed by a single cover.

Another object of the invention is to provide a bait box having a spring actuated hinged cover which is movable and held in closed or open position by the spring actuating means thereof.

A further object is to provide a bait box having a hinged cover with spring actuating means therefor which is substantially enclosed to prevent the rusting thereof and also to prevent the bait or other matter carried in the box from coming in contact with the spring actuating means.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a top plan view of the bait box which forms the subject matter of the present invention with parts broken away.

Figure 2 is a vertical sectional view taken centrally through the box and showing the position of the parts in full lines when the cover is arranged in open position, and in dotted lines when the cover is arranged in closed position.

Figure 3 is a sectional view taken on line 3—3 of Figure 2.

Referring to the drawings in detail the reference numeral 1 indicates a receptacle which is provided with a substantially arcuate shaped inner wall 2 so as to conform and adapt itself to the waist of the wearer, and with a similar shaped front wall 3 which merges into the inner wall by the curved ends as clearly shown in Figure 1 of the drawings. The inner wall has formed and extending therefrom a pair of spaced loops 4 adapted to receive a belt or the like whereby the receptacle can be adequately supported upon the person.

Arranged transversely of the receptacle midway its ends are a pair of spaced plates 5 and 6 formed with a top wall 7 and together with said plates provide a partition for dividing the receptacle into separate compartments 8 and 9, so that bait of different varieties can be arranged in the separate compartments as will be readily apparent.

A cover 10 is included in the top wall and is hinged to the portion 11 thereof as shown in Figure 1. Passing through a slot 12 formed in the portion 11 is a hook shaped arm 13 having an ear 14 formed on its outer end and which is secured to the cover 10 at the central portion of its hinged edge. The hook shaped arm 13 has a straight inner portion 15 movable between the plates 5 and 6 of the partition and the inner end of the inner portion is pivoted between the bifurcated upper end 16 of the rod 17 through the instrumentality of the pivot pin 18 in the manner as shown in Figure 3. The rod has formed adjacent its bifurcated end 16 a disk 19 and the said rod is slidably mounted in a plate 20 which has studs 21 extending from opposite sides thereof and received in bearings 22 formed in the walls 5 and 6 as shown in Figure 1. A coil spring 23 surrounds the rod 17 and has its end convolutions engaging the disk 19 and the plate 20.

From the above description and disclosure presented by the drawings, it will be apparent that the means for retaining the cover 10 in closed or open position is properly housed to prevent the same from rusting or to come in contact with the bait within the receptacle, and by the novel shape of the arm 13 and its association with the spring actuated rod 17, it will be obvious that the lid will be retained in an open or closed position as desired.

It is thought from the foregoing description that the advantages, and novel features of my invention will be readily apparent.

I desire it to be understood that I may make changes in the construction and in the combination and arrangement of the several parts, provided that such changes fall within the scope of the appended claims.

What I claim is:

1. A bait box of the character described comprising a receptacle, a pair of spaced plates arranged transversely of the receptacle and providing a partition forming separate compartments, a hinged cover for the receptacle, a hook shaped arm having one end secured to said cover and its opposite end arranged in the partition, a plate mounted for pivotal movement between the side walls of the partition, a rod having a bifurcated upper end for pivotally receiving the inner end of said hook shaped arm, and means surrounding said rod, and adapted with the latter and the hook shaped arm respectively for retaining the cover in a closed or open position.

2. A bait box of the character described comprising a receptacle, a pair of plates arranged transversely of the receptacle and providing walls forming a partition dividing the receptacle into separate compartments, a top wall portion for the receptacle, a cover therefor and being hinged to the top wall portion which is provided with a slot, a hook shaped arm passing through said slot, an ear formed on said arm and secured to the cover, a rod pivotally secured to the inner end of said arm and arranged between the side walls of the partition, a plate mounted for pivotal movement between the walls of the partition and slidably receiving the rod, a disk secured to said rod, and a coil spring having its end convolutions engaging said disk and pivoted plate respectively.

In testimony whereof I affix my signature.

JOHN M. WATTAWA.